United States Patent
Kotwal et al.

(10) Patent No.: US 11,748,002 B2
(45) Date of Patent: Sep. 5, 2023

(54) HIGHLY CONCURRENT DATA STORE ALLOCATION

(71) Applicant: VMware, Inc., Palo Alto, CA (US)

(72) Inventors: Aditya Kotwal, Sunnyvale, CA (US); Venkata Ramanan, Sunnyvale, CA (US); Sandeep Rangaswamy, Mountain View, CA (US); Brian Caulfield, Seattle, WA (US)

(73) Assignee: VMware, Inc., Palo Alto, CA (US)

( * ) Notice: Subject to any disclaimer, the term of this patent is extended or adjusted under 35 U.S.C. 154(b) by 40 days.

(21) Appl. No.: 17/347,491

(22) Filed: Jun. 14, 2021

(65) Prior Publication Data

US 2022/0398025 A1 Dec. 15, 2022

(51) Int. Cl.
*G06F 3/06* (2006.01)
*G06F 9/50* (2006.01)

(52) U.S. Cl.
CPC ............ *G06F 3/0631* (2013.01); *G06F 3/064* (2013.01); *G06F 3/0604* (2013.01); *G06F 3/0659* (2013.01); *G06F 9/5016* (2013.01)

(58) Field of Classification Search
CPC ...... G06F 3/0631; G06F 3/0604; G06F 3/064; G06F 3/0659; G06F 9/5016
See application file for complete search history.

(56) References Cited

U.S. PATENT DOCUMENTS

2014/0195767 A1* 7/2014 Colombo ............. G06F 3/0631
711/170

OTHER PUBLICATIONS

Ashkiani et al., A Dynamic Hash Table for the GPU, 2018, IEEE, 11pages (Year: 2018).*
Li et al., "An efficient multi-threaded memory allocator for PDES applications," Simulation Modelling Practice and Theory, Apr. 2020, 100:102067, 19 pages.
Li et al., "HMalloc: A Hybrid, Scalable, and Lock-Free Memory Allocator for Multi-Threaded Applications," IEEE 25th International Conference on Parallel and Distributed Systems, Dec. 4-6, 2019, pp. 406-409.
Zhang et al., "High Efficiency General Memory Allocator," Computer Science and Technology, 2017, pp. 91-96.

* cited by examiner

*Primary Examiner* — Gary W. Cygiel
(74) *Attorney, Agent, or Firm* — Dinsmore & Shohl LLP

(57) ABSTRACT

Methods, systems, and apparatus, including computer programs encoded on computer storage media, for executing concurrent writes to a data store. One of the systems includes a data store comprising a plurality of storage segments, wherein each storage segment comprises a plurality of blocks; and an allocator system comprising: a plurality of threads, and a plurality of bitmaps each corresponding to a respective storage segment of the data store, wherein the allocator system is configured to perform operations comprising: assigning a respective bitmap to each thread of the plurality of threads; and executing, by each thread of the plurality of threads, one or more write requests to one or more blocks of the storage segment corresponding to the thread using the bitmap assigned to the thread, wherein executing a write request by a thread includes updating the bitmap assigned to the thread.

17 Claims, 4 Drawing Sheets

HIGHLY CONCURRENT DATA STORE ALLOCATION

BACKGROUND

This specification generally relates to data storage allocation.

Some existing storage systems maintain a bitmap that represents the availability of a data store. Each bit in the bitmap corresponds to a respective block in the data store, and the value of the bit identifies whether or not the block is available to be written to. When a thread of the storage system writes data to a block of the data store, the thread updates the bitmap to indicate that the block is no longer available.

To ensure that two threads do not update the bitmap at the same time (potentially introducing errors to the bitmap), some existing storage systems place a lock on the bitmap. That is, when a particular thread updates the bitmap, the thread first "locks" the bitmap from being updated by any other thread. When the thread is finished updating the bitmap, the thread can "unlock" the bitmap so that the bitmap is again available to be updated by the other threads.

An important factor for the efficiency of a storage system is "contention," which occurs when multiple different threads attempt to use the same resource (e.g., attempt to access the same bitmap) simultaneously. A storage system can reduce contention, and thereby improve performance, by reducing the proportion of time that multiple threads are vying for the same resource.

SUMMARY

This specification generally describes a storage system that can execute concurrent writes to a data store using multiple different bitmaps representing the availability of respective storage segments of the data store.

In particular, each thread, of multiple threads, of the storage system can be assigned to a respective bitmap. The thread uses the assigned bitmap to execute write requests to the corresponding storage region of the data store. Because each thread operates using its own bitmap, the threads can execute write requests in parallel without any contention caused by threads attempting to access the same bitmap. When a thread has filled its bitmap, i.e., when there is no remaining space available in the corresponding storage segment, the thread can be assigned another bitmap of the multiple bitmaps. While there are more available bitmaps than threads, the storage system can guarantee that there will be no contention between the different threads.

Particular embodiments of the subject matter described in this specification can be implemented so as to realize one or more of the following advantages.

Using techniques described in this specification, a storage system can execute concurrent writes to a data store while minimizing contention between the threads, thus significantly improving the performance of the storage system. Thus, the number of operations that can be executed by the storage system can scale linearly, or nearly linearly, with the number of threads. In some implementations, two threads are only ever assigned the same bitmap (introducing the possibility of contention) after each other bitmap has been filled. In some implementations, storage system can reduce the likelihood that multiple threads are assigned to the same bitmap by generating many more bitmaps than threads.

Furthermore, in some implementations, maintaining multiple different bitmaps introduces little to no memory overhead relative to using a single bitmap. That is, there is negligible additional memory and computational requirements required by the multiple bitmaps (e.g., there may be minimal additional metadata maintained by the multiple bitmaps), and consequently the storage system can ensure that it has a bounded and low memory footprint.

Using techniques described in this specification, a storage system can reduce or eliminate "hot spots" within a data store. In this specification, hot spots are memory addresses that are written to significantly more often than other memory addresses. The existence of hot spots can reduce the performance and lifetime of storage devices. Some storage systems described in this specification can distribute the threads evenly across the storage segment of the data store. This can ensure that no one storage segment experiences disproportionate activity, and thus significantly improve performance of the storage system.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes techniques for executing concurrent writes to a data store of a storage system while minimizing contention between different threads of the storage system.

Figure 1:
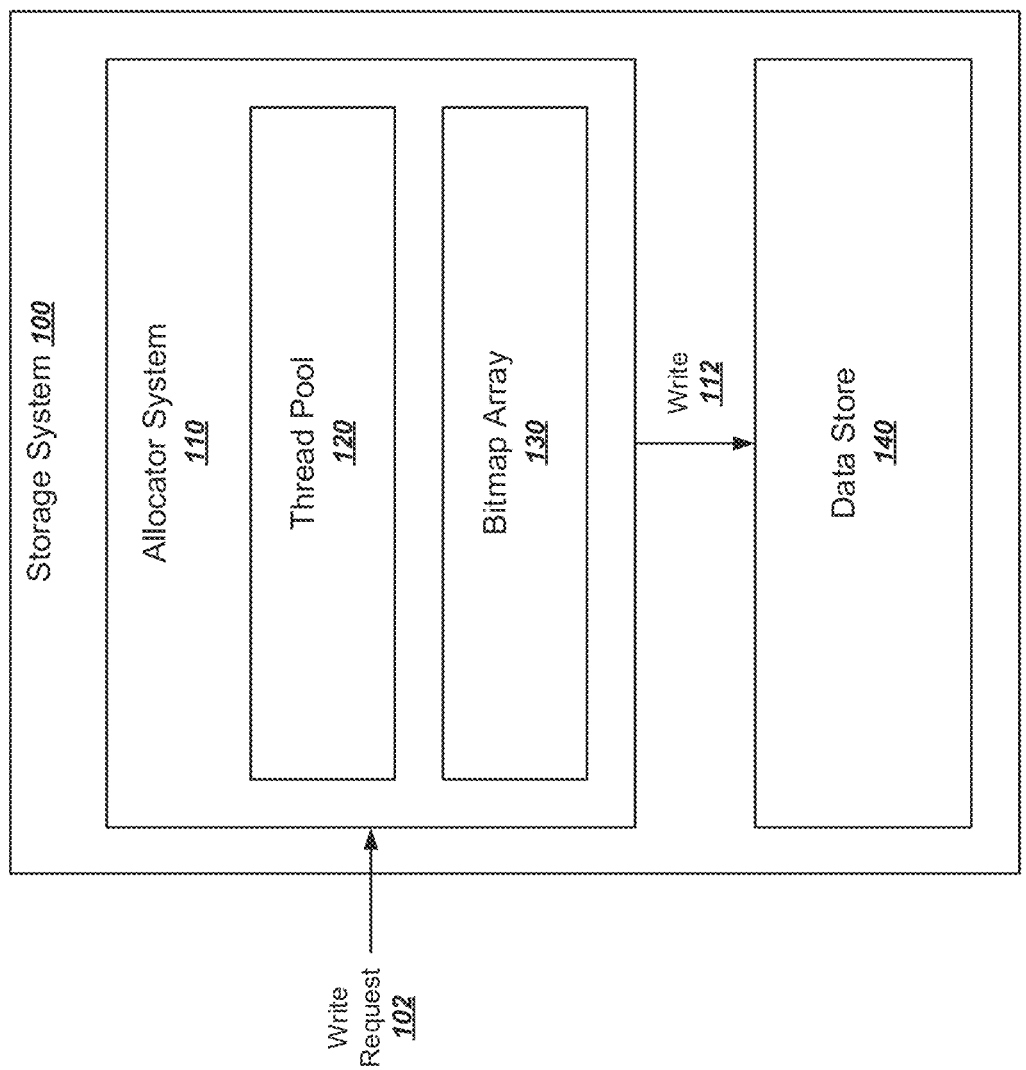
FIG. 1 is a diagram of an example storage system.

FIG. 1 is a diagram of an example storage system 100. The storage system 100 includes an allocator system 110 and a data store 140.

The allocator system 110 is configured to receive a write request 102 and, in response, execute a write 112 that writes data associated with the write request 102 to the data store 140. The storage system 100 can receive the write request 102 from any appropriate source. For example, the storage system 100 can receive the write request 102 from an external computer system or application, e.g., from a user device or from a virtual machine on behalf of a user or user system. The data associated with the write request 102 can be any appropriate type of data. For example, the write request 102 can include one or more of: text data, image data, video data, financial data, medical data, etc.

The allocator system 110 includes a thread pool 120 and a bitmap array 130. The thread pool 120 is a set of multiple threads of the allocator system 110 that can each write data to the data store 140. For example, for each write request 102 received by the allocator system 110, the allocator system 110 can assign the write request 102 to one of the multiple threads of the thread pool 120, which can then execute the write 112.

As another example, the allocator system 110 can assign each thread of the thread pool 120 to a respective source of write requests 102. That is, whenever the storage system 100 receives a write request 102 from a particular source (e.g., a particular user, a particular external system, or a particular subsystem of an external system), the thread assigned to the particular source can execute the write 112. In some implementations, multiple threads of the thread pool 120 can be assigned to the same source; when the storage system 100 receives a write request 102 from the source, the allocator system 110 can assign the write request 102 to one of the multiple threads assigned to the source.

The data store 140 can include one or more disks that are configured to store data. Each disk of the data store 140 can be divided into multiple storage segments, or simply "segments," of consecutive addresses. Each segment of the data store 140 can itself be divided into multiple "blocks" of consecutive addresses.

Although this specification generally refers to "disks" of a storage system, the same techniques can be performed on any other appropriate configuration of hardware, e.g., sites, racks, chassis, hosts, etc. In some implementations, the data store 140 is itself a virtual storage space managed by a lower-level system, and so the data store 140 provides the data associated with the write request 102 to the lower-level system that manages the corresponding physical storage space.

The bitmap array 130 of the allocator system 110 includes multiple bitmaps that each correspond to a respective storage segment of the data store 140. The bitmap corresponding to a storage segment represents the availability of the storage segment, i.e., whether or not data can be written to the storage segment. In particular, each bit of the bitmap can identify whether a respective block of the storage segment is available (e.g., as identified by a '0' value of the bit) or unavailable (e.g., as identified by a '1' value of the bit). A block is unavailable if it includes "live" data, i.e., data that must be maintained. A block is available if it does not include live data. For example, a block can be available if it includes only "stale" data that is no longer required to be maintained but that has not yet been removed or overwritten.

In other words, instead of maintaining a single bitmap representing the availability of the entire data store 140, the allocator system 110 can maintain multiple smaller bitmaps that each represent the availability of respective subsets of the data store 140.

Figure 2:
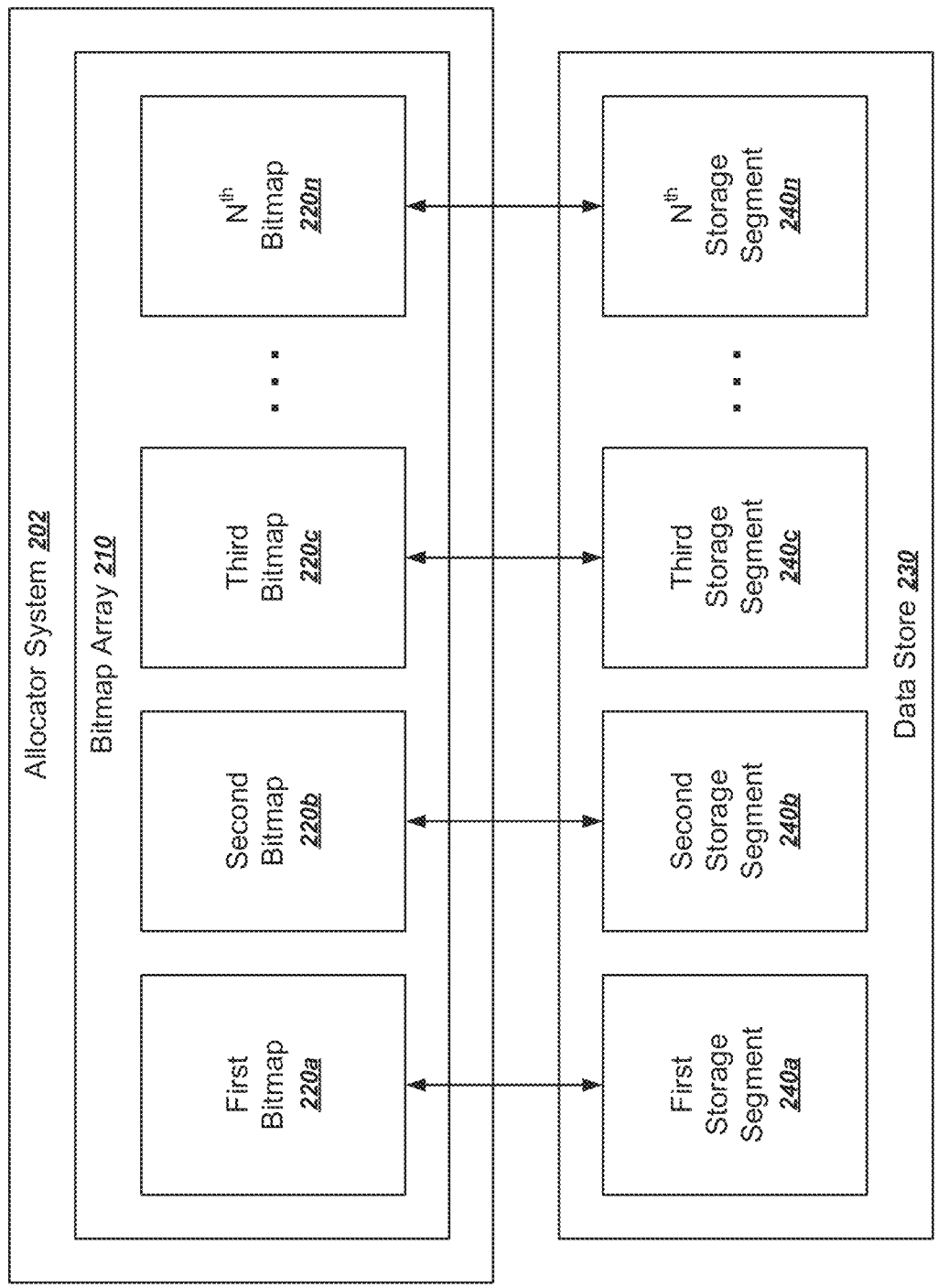
FIG. 2 is a diagram of an example bitmap array and an example data store.

FIG. 2 depicts an example bitmap array 210 and a corresponding example data store 230. The bitmap array 210 is a component of an allocator system 202, which can be configured similarly to the allocator system 110 depicted in FIG. 1.

The bitmap array 210 includes N bitmaps 220a-n, where N>1. Each bitmap 220a-n corresponds to a respective storage segment 240a-n of the data store 230. As described above, the values of the bits in each bitmap 220a-n represent the availability of the blocks of the corresponding storage segment 240a-n.

Typically, each block in a given storage segment 240a-n is the same size, and therefore each bit in the corresponding bitmap 220a-n represents the same amount of data. In some implementations, different storage segments 240a-n can include blocks of respective different sizes. The first storage segment 240a and the third storage segment 240c can have blocks of a first size (e.g., 4 KB), and the second storage segment 240b and the $N^{th}$ storage segment 240n can have blocks of a second size (e.g., 128 KB). In some such implementations, the storage segments 240a-n can store different types of data according to the size of their blocks. For example, storage segments 240a-n that have relatively large blocks (e.g., 64 KB, 128 KB, 256 KB, or 512 KB) can be used as the main data storage for an external system, while storage segments 240a-n that have relatively small blocks (e.g., 2 KB, 4 KB, 8 KB, or 16 KB) can store metadata for the external system. In other words, the size of the blocks used to store data can depend on the type of write request or the application that is sending the write request.

Typically, the size of the blocks of a particular storage segment 240a-n of the data store 230 is the smallest unit of data that the allocator system 202 is configured to write to the particular segment. That is, if the allocator system 202 receives a write request and determines to write the associated data to a particular storage segment 240a-n of the data store 230 (as described above), and the associated data is smaller than the size of the blocks of the particular storage segment 240a-n, then the allocator system 202 can still allocate an entire block for the associated data and identify the block as unavailable in the corresponding bitmap 220a-n.

In some implementations, the bitmaps 220a-n are themselves stored in the data store 230. That is, even though the bitmap array 210 is depicted is being a component of the allocator system 202 (because the allocator system 202 uses the bitmap array 210 to determine where in the data store 230 to allocate space for new writes), the bitmaps 220a-n can be hosted by the data store 230. In some other implementations, the bitmaps 220a-n are hosted elsewhere, e.g., in a different address space of the same physical device as the data store 230, on a different physical device in the same geographic location as the data store 230 (e.g., the same data center as the data store 230) or in an entirely different geographic location as the data store 230.

In some implementations, the bitmaps 220a-n are all stored in contiguous memory addresses. That is, the bitmap array 210 can be stored in a single continuous region of memory, with final memory address of each bitmap directly preceding the first memory address of the next bitmap in the bitmap array 210. As is described in more detail below with reference to FIG. 3, storing the bitmaps 220a-n contiguously can allow the allocator system 202 to easily traverse the bitmaps 220a-n of the bitmap array 210.

Referring back to FIG. 1, the threads of the allocator system 110 can use the bitmap array 130 to determine where to execute each write 112. In particular, the allocator system 110 can assign each thread in the thread pool 120 to one of the bitmaps in the bitmap array 130 (or, equivalently, to one of the storage segments of the data store 140). When a thread is assigned a write request 102, the thread can write the associated data to the segment of the data store 140 corresponding to the bitmap to which the thread has been assigned.

When the segment corresponding to a thread has been completely filled, i.e., when all of the blocks of the segment include live data (and therefore each bit of the corresponding bitmap has, e.g., a '1' value), then the allocator system 110 can assign another bitmap to the thread. In particular, the allocator system 110 can identify a bitmap in the bitmap array 130 that has available space (i.e., a bitmap whose values indicate that the corresponding segment in the data store 140 has at least one available block) and assign the identified bitmap to the thread. An example process for assigning bitmaps to threads is described in more detail below with reference to FIG. 3.

Typically, there are fewer threads in the allocator system 110 than bitmaps in the bitmap array 130. Therefore, at any point in time, some of the bitmaps in the bitmap array 130 will not be assigned to any thread. That is, if there are N bitmaps in the bitmap array 130 and M threads in the allocator system 110, N>M, then at any one point in time (N-M) of the bitmaps will be unassigned. The unassigned bitmaps can include i) "available" bitmaps that represent storage segments with at least one available block, ii) "unavailable" bitmaps that represent storage segments that do not have any available blocks, or iii) both.

For example, the allocator system 110 can include 4, 8, 10, 20, 100, or 1000 threads. The bitmap array can include thousands, tens of thousands, or hundreds of thousands of bitmaps. Therefore, in this example, a majority of the bitmaps in the bitmap array 130 are unassigned at any one point in time.

As a particular example, each bitmap in the bitmap array 130 can be 4 KB (i.e., include 32,000 bits), where each bit represents blocks of size 4 KB. Each bitmap therefore represents an approximate storage segment size of 128 MB. In this example, a 1 TB disk in the data store 140 would be represented by around 8000 bitmaps; a 4 TB disk would be represented by around 32000 bitmaps; and a 16 TB disk would be represented by around 128000 bitmaps.

As another particular example, a particular bitmap in the bitmap array 130 can be 4 KB, where each bit represents blocks of size 128 KB. The particular bitmap therefore represents an approximate storage segment size of 4 GB. In this example, a 1 TB disk in the data store 140 would be represented by around 250 bitmaps; a 4 TB disk would be represented by around 1000 bitmaps; and a 16 TB disk would be represented by around 4000 bitmaps.

Figure 3:
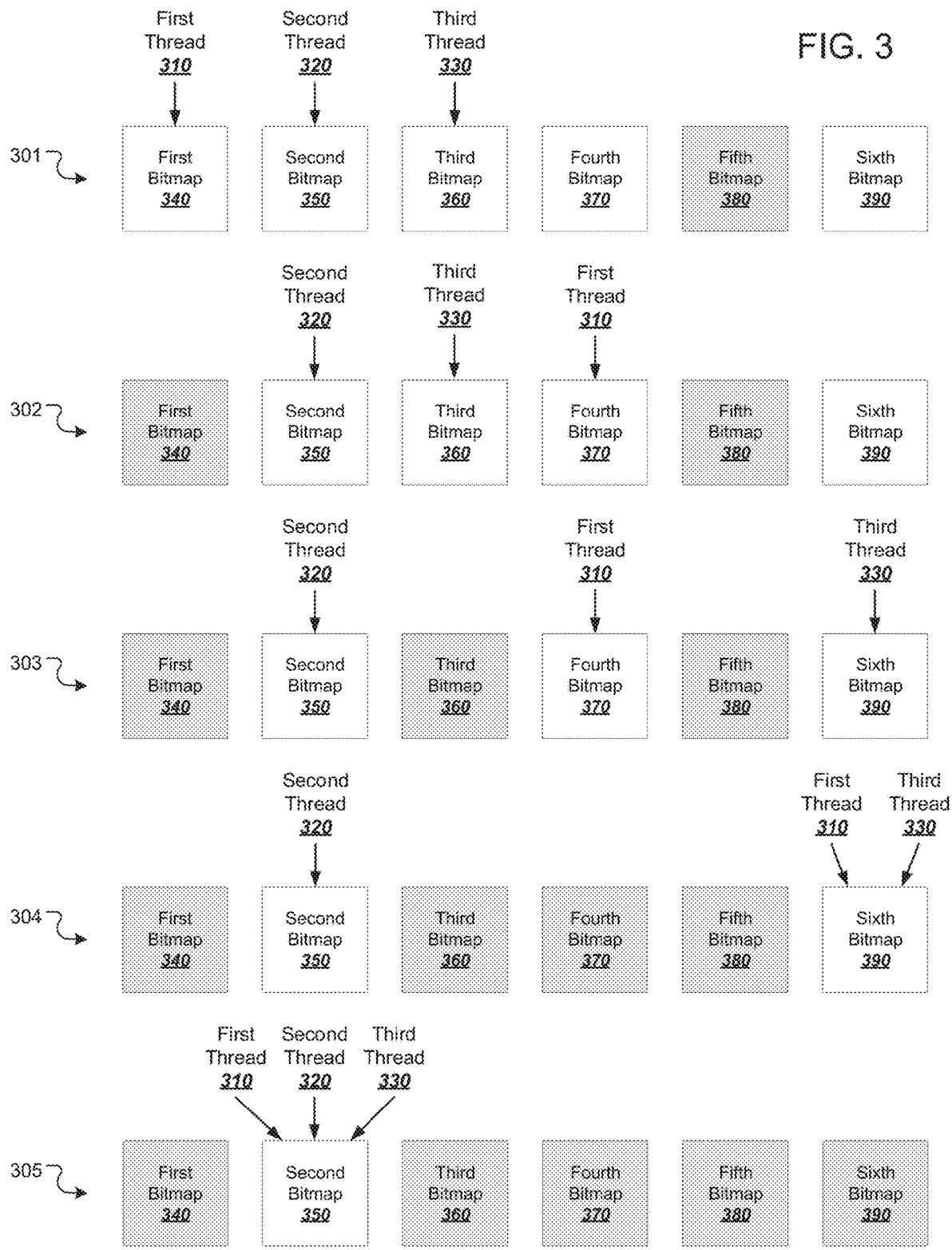
FIG. 3 is an illustration of threads of a storage system being assigned to different bitmaps across time.

FIG. 3 is an illustration of three threads 310, 320, and 330 of a storage system being assigned to six bitmaps 340, 350, 360, 370, 380, and 390 across five time steps 301, 302, 303, 304, and 305. Although only three threads and six bitmaps are illustrated in FIG. 3 for ease of understanding, generally a storage system can include many more threads and/or many more bitmaps.

The threads 310-330 can be threads of an allocator system, e.g., the allocator 110 depicted in FIG. 1, that is configured to write data to a data store, e.g., the data store 140 depicted in FIG. 1. Each bitmap 340-390 represents the availability of a different respective storage segment of the data store, as described above. The threads 310-330 are configured to write data to the storage segment corresponding to the assigned bitmap 340-390, and update the assigned bitmap 340-390 to reflect the write.

At a first time point 301, the first thread 310 is assigned to the first bitmap 340, the second thread 320 is assigned to the second bitmap 350, and the third thread 330 is assigned to the third bitmap 360.

In FIG. 3, bitmaps that are "available," i.e., that represent storage regions with at least one available block, have a white color while bitmaps that are "unavailable," i.e., that represent storage regions with no available blocks, have a gray color. For example, at the first time point 301, the fifth bitmap 380 is unavailable, e.g., because the corresponding storage region was filled by one of the threads 310-330 at a previous time point.

At a second time point 302, the first thread 310 has filled the storage segment corresponding to the assigned first bitmap 340, and so the first bitmap 340 has become unavailable. The allocator system must therefore assign the first thread 310 to another bitmap that is available.

The allocator system can search through the bitmaps 340-390 (e.g., using the first thread 310 or another thread) to identify a bitmap that is both i) available and ii) not assigned to any other thread 310-330. Thus, the allocator system would not assign the first thread 310 to either the second bitmap 350 or third bitmap 360 (because they are assigned to other threads), or to the fifth bitmap 380 (because it is unavailable). One of the goals of the storage system is to minimize contention, i.e., attempts by multiple threads to access the same bitmap. Such contention can only occur when two or more threads are assigned to the same bitmap. Therefore, whenever possible, the allocator system will assign a thread to a bitmap that has no other threads assigned to it. In the example depicted in FIG. 3, the allocator system assigns the first thread 310 to the fourth bitmap 370.

To assign a bitmap to a thread, the allocator system can require that the storage segment corresponding to the bitmap have more than a threshold number of available blocks. This specification generally refers to a bitmap as "available" when the bitmap represents a storage segment with at least one available block, but generally the threshold number of available blocks can be any positive integer, e.g., 10, 100, or 1000.

In some implementations, each bitmap 340-390 includes metadata identifying whether the bitmap is currently assigned to a thread. For example, each bitmap 340-390 can include an "ownership bit" that takes value '0' if the bitmap is unassigned and '1' if the bitmap is assigned (or vice versa). Instead, or in addition, each bitmap 340-390 can include data identifying the specific thread to which the bitmap is assigned. When the allocator system assigns a bitmap to a thread, the allocator system can update the metadata to reflect that the thread has been assigned.

In some implementations, each bitmap 340-390 includes metadata identifying whether the bitmap is available, e.g., whether the bitmap represents a storage segment that includes at least one available block. For example, each bitmap 340-390 can include an "availability bit" that takes value '0' if the bitmap is available and '1' if the bitmap is unavailable. Instead, or in addition, each bitmap 340-390 can include a "numFree" value that identifies the number of blocks that are available in the corresponding storage segment. When a thread writes data to the corresponding storage segment, the thread can update the metadata to reflect the updated number of available blocks in the storage segment.

The allocator system can use the metadata during the search for an appropriate bitmap to assign to the first thread 310. That is, for each bitmap evaluated by the allocator system during the search, the allocator system can use the metadata to determine i) whether the bitmap is assigned (e.g., by determining the value of the ownership bit) and ii) whether the bitmap is available (e.g., by determining whether the numFree value is greater than zero).

The allocator system can search the bitmaps 340-390 using any appropriate technique. For example, the bitmaps 340-390 can have an assigned ordering (e.g., the order illustrated in FIG. 3), and the allocator system can search in order through the bitmaps. In some implementations, as described above, the bitmaps 340-390 are stored in contiguous memory addresses, and therefore the ordering of the bitmaps 240-290 can simply be the ordering in which they are stored. In these implementations, the allocator system can search through the bitmaps 340-390 with high efficiency because each bitmap immediately follow the previous bitmap in memory. In some other implementations, the bitmaps 340-390 can be stored in a linked list in the predetermined ordering.

As a particular example, the allocator system can start the search at the first bitmap in the ordering. As another particular example, the allocator system can start the search at the bitmap to which the first thread 310 was previously assigned (which, in this case, is the same first bitmap 340).

Generally, when searching for a bitmap to assign to a thread, starting the search at the bitmap to which the thread was previously assigned can ensure that there are no "hot spots" in the data store, i.e., memory addresses that are written to significantly more often than other memory addresses. If the allocator system always begins the search at the first bitmap in the ordering, there may be a risk that bitmaps earlier in the ordering will experience significantly more traffic than bitmaps later in the ordering. For example, if the first bitmap is eventually made available again (e.g., if the data stored in the first bitmap 340 is no longer needed by the external system), then the first bitmap may be assigned to a thread multiple times before later bitmaps are every assigned to a thread. This can reduce the performance of the storage system; for example, the increased activity in the storage segment corresponding to the first bitmap can reduce the lifetime of the physical device used to host the storage segment. On the other hand, starting the search at the bitmap to which the thread was previously assigned ensures that the allocator system cycles through each bitmap (and therefore each storage segment) before returning to the first bitmap in the ordering.

As another particular example, the allocator system can maintain data representing a "candidate" next free bitmap. At any point in time, the candidate next free bitmap identifies the next bitmap in the ordering of bitmaps that is predicted by the storage system to be both available and unassigned. The candidate next free bitmap is merely a "candidate" because, in some implementations, it is not guaranteed to be correct, i.e., not guaranteed to be both available and unassigned. For example, in some implementations, the candidate next free bitmap may be stale for short periods of time, e.g., immediately after the candidate next free bitmap is assigned to a thread. In some other implementations, the candidate next free bitmap is guaranteed to be correct. For convenience, this specification generally refers to a "candidate" next free bitmap even in cases in which it is guaranteed to be correct.

Because the candidate next free bitmap may be incorrect, the allocator system can evaluate the next free bitmap to determine determines whether it is actually both available and unassigned. If so, the allocator system can determine to assign the first thread 310 to the candidate next free bitmap. If the allocator system determines that the candidate next free bitmap is either unavailable, assigned to another thread, or both, then the allocator system can move to the subsequent bitmap in the ordering of bitmaps and continue the search.

When the storage system is first configured, the candidate next free bitmap can be initialized to be the first bitmap in the ordering that is not assigned to one of the threads 310-330; e.g., it can be initialized to be the fourth bitmap 370.

When the allocator system assigns a thread to the candidate next free bitmap, the allocator system can update the data identifying the candidate next free bitmap. For example, the allocator system can search the bitmaps 340-390 to identify another bitmap that is both available and unassigned. As a particular example, beginning at the previous "candidate next free bitmap" and continuing through the bitmaps in the predetermined order, the allocator system can evaluate each bitmap using the metadata described above. In the example depicted in FIG. 3, the allocator system may determine the sixth bitmap 390 to be the candidate next free bitmap. That is, the allocator system can do the work of identifying the next bitmap to assign to a thread "up front," before any threads require another bitmap. Thus, when a thread does need to be assigned another bitmap, the allocator system can immediately identify the candidate next free bitmap.

In some cases, a thread may receive a write request for an amount of data that is larger than the remaining available blocks in the corresponding storage segment. In these cases, the thread can write as much of the data as it can (i.e., write to the remaining available blocks of the storage segment) and respond to the write request with data identifying how much of the data has been written. The external system can then re-submit the write request, and the thread can write the remaining data to its new storage segment. For example, the first thread 310 can write a portion of the data associated with a write request to the first bitmap 340 at the first time point 301, and then write the remaining data associated with the write request to the fourth bitmap 370 at the second time point 302.

At a third time point 303, the third thread 330 has filled the storage segment corresponding to the assigned third bitmap 260, and so the third bitmap 360 has become unavailable. The allocator system can therefore assign the third thread 330 to another bitmap, as described above. In this example, the allocator system assigns the third thread 330 to the sixth bitmap 390.

In implementations in which the allocator system maintains data representing the candidate next free bitmap (which, in this example, was the sixth bitmap 390), the allocator system can update the data to reflect the fact that the former candidate next free bitmap has been assigned. However, there are no more bitmaps that are both available and unassigned; each bitmap representing a storage segment with available blocks has already been assigned. Therefore, in some implementations, the allocator system can identify a bitmap that is assigned to a thread but that represents a storage segment with available blocks and determine the identified bitmap to be the candidate next free bitmap.

At a fourth time point 304, the first thread 310 has filled the storage segment corresponding to the assigned fourth bitmap 370, and so the fourth bitmap 370 has become unavailable. The allocator system can therefore assign the first thread to another bitmap. However, as described above, there are no remaining bitmaps that are both available and unassigned. Therefore, the allocator system can assign the first thread 310 to a bitmap that represents a storage segment with available blocks, but that is already assign to another thread. In the example depicted in FIG. 3, the allocator system assigns the first thread 310 to the sixth bitmap 390, which has already been assigned to the third thread 330.

As discussed above, assigning multiple threads to the same bitmap introduces the possibility of contention in the bitmap. For example, when updating the sixth bitmap 390 in response to a new write request, the first thread 310 or the third thread 330 may be required to lock the sixth bitmap 390 from being accessed by the other thread, potentially causing the other thread to have to wait to execute its own write request. Thus, in some implementations, the storage system can maintain significantly more bitmaps than threads (e.g., 10x, 100x, or 1000x more), reducing the likelihood that multiple threads ever have to share a bitmap.

In some implementations, each thread 310-330 always locks its assigned bitmap when updating the bitmap, even if only one thread is assigned to the bitmap. That is, at the third time point 303, the third thread 330 would still lock the sixth bitmap 390 when executing a write request, even though the third thread 330 is the only thread assigned to the sixth bitmap 390. Therefore, when the first thread 310 is also assigned to the sixth bitmap 390 at the fourth time step 304, the third thread 330 does not need to be notified that it is now sharing the sixth bitmap 390 with the first thread 310. In other words, in some situations, the threads 310-330 do not have access to data identifying which bitmap is assigned to each other thread and so the bitmaps 310-330 do not know whether they are sharing their assigned bitmap or not.

In some implementations, the storage system can ensure that multiple threads are never (or rarely) assigned to the same bitmap by reactively increasing the size of the data store when one or more conditions are met. For example, the storage system can automatically increase the number of storage segments (and corresponding bitmaps) by adding one or more disks to the data store. As a particular example, the storage system can automatically grow the data store in response to determining that one or more conditions have been satisfied, e.g., in response to determining that a number of available bitmaps, or a proportion of available bitmaps, has dropped below a predetermined threshold. As another example, the storage system can notify a user or an external system that one or more conditions have been satisfied, recommending that the user or external system increase the size of the data store or take some other action.

At a fifth time point 305, the first thread 310 and/or the third thread 330 have filled the storage segment corresponding to the assigned sixth bitmap 390, and so the sixth bitmap 390 has become unavailable. Therefore, the allocator system can assign the first thread 310 and the third thread 330 to respective other bitmaps. In the example depicted in FIG. 3, the allocator system assigns both the first thread 310 and the third thread 330 to the second bitmap 350, which has already been assigned to the second thread 320. Generally, when a bitmap assigned to multiple threads is filled, the allocator system can assign each thread to a different bitmap. For example, the allocator system can prioritize distributing the threads so that no bitmap is assigned three or more threads.

Therefore, at the fifth time step 305, each thread 310-330 of the storage system is assigned to the same second bitmap 350, which is the only available bitmap in the storage system. When the storage segment corresponding to the second bitmap 350 has been filled (and thus when there is no remaining available bitmap in the storage system), the storage system can declare out-of-memory, e.g., by sending a notification to the external system. As described above, in some implementations the storage system ensure that there will always be available storage segments by expanding the size of the data store.

Figure 4:
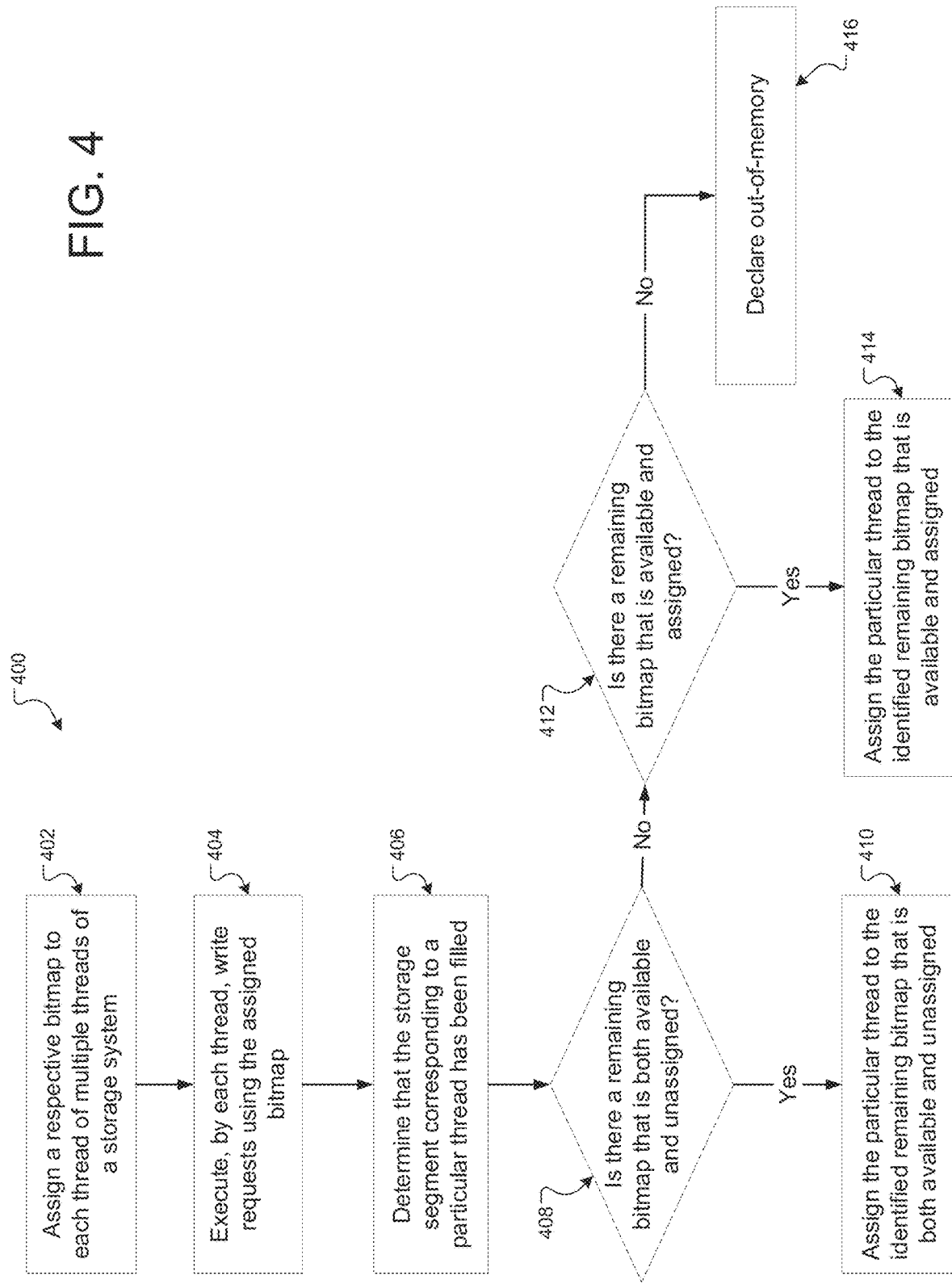
FIG. 4 is a flow diagram of an example process for using multiple bitmaps to allocate memory in a storage system.

FIG. 4 is a flow diagram of an example process 400 for using multiple bitmaps to allocate memory in a storage system. For convenience, the process 400 will be described as being performed by a system of one or more computers located in one or more locations. For example, a storage system, e.g., the storage system 100 depicted in FIG. 1, appropriately programmed in accordance with this specification, can perform the process 400.

The storage system can include a data store that has multiple storage segments, where each storage segment includes multiple blocks that are configured to store data. The storage system can also include multiple bitmaps that each correspond to a respective storage segment of the data store, where each bitmap includes multiple bits that each represent the availability of a respective block of the corresponding storage segment.

The system assigns a respective bitmap to each thread of multiple threads of the storage system (step 402).

The system executes, by each thread of the multiple threads, one or more write requests using the assigned bitmap (step 404). The thread can obtain data associated with the write request and write the obtained data to one or more blocks of the storage segment corresponding to the thread. The thread can then update the bitmap assigned to the thread, including updating the bits of the bitmaps that represent the blocks to which the obtained data was written.

The system determines that the storage segment corresponding to a particular thread has been filled (step 406). In other words, the system determines that the storage segment does not have any remaining available blocks. Therefore, the particular thread must be reassigned a different bitmap.

In response to determining that the storage segment corresponding to the particular thread has been filled, the system determines whether there is a remaining bitmap that is both unassigned to any thread and available, i.e., corresponds to a storage segment that includes one or more available blocks (step 408).

If there is a bitmap remaining that is available and unassigned, the system assigns the particular thread to the identified remaining bitmap (step 410).

If there is not such a bitmap remaining, the system determines whether there is a remaining bitmap that is available but assigned to another thread (step 412).

If there is a bitmap remaining that is available and assigned to another thread, the system assigns the particular thread to the identified remaining bitmap (step 414).

If there is no bitmap that is available, then the system sends a notification declaring that it is out of memory (step 416).

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; solid state drives, NVMe devices, persistent memory devices, magnetic disks, e.g., internal hard disks or removable disks; magneto-optical disks; and CD-ROM and DVD-ROM and Blu-ray discs. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g, a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communications network. Examples of communications networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a system comprising:
    a data store comprising a plurality of storage segments, wherein each storage segment comprises a plurality of blocks that are configured to store data; and
    an allocator system comprising:
    a plurality of threads, and
    a plurality of bitmaps each corresponding to a respective storage segment of the data store, wherein each bitmap comprises a plurality of bits each representing an availability of a respective block of the corresponding storage segment,
    wherein the allocator system is configured to perform operations comprising:
        assigning a respective bitmap to each thread of the plurality of threads; and
        executing, by each thread of the plurality of threads, one or more write requests to one or more blocks of the storage segment corresponding to the thread using the bitmap assigned to the thread, wherein executing a write request by a thread includes updating the bitmap assigned to the thread, comprising updating the bits of the bitmap that represent the blocks to which data was written.

Embodiment 2 is the system of embodiment 1, wherein the operations further comprise:

determining that the storage segment corresponding to a first thread has been filled and in response:

determining whether there is a remaining bitmap that (i) is unassigned to a thread and (ii) corresponds to a storage segment that includes one or more available blocks, and in response to determining that there is a remaining bitmap, assigning the remaining bitmap to the first thread.

Embodiment 3 is the system of embodiment 2, wherein the operations further comprise, in response to determining that there is no remaining bitmap that (i) is unassigned to a thread and (ii) corresponds to a storage segment that includes one or more available blocks:

identifying a particular bitmap that (i) is already assigned to a second thread and (ii) corresponds to a storage segment that includes one or more available blocks; and assigning the particular bitmap to the first thread so that the particular bitmap is assigned to both the first thread and the second thread, wherein updating the particular bitmap by the first thread comprises locking the particular bitmap from being simultaneously updated by the second thread.

Embodiment 4 is the system of any one of embodiments 2 or 3, wherein the operations further comprise:

maintaining first data identifying a candidate next free bitmap that (i) is predicted not to be assigned to a thread and (ii) corresponds to a storage segment that is predicted to include one or more available blocks, wherein determining whether there is a remaining bitmap comprises evaluating the candidate next free bitmap.

Embodiment 5 is the system of embodiment 4, wherein:

the plurality of bitmaps have a predetermined ordering; and maintaining first data identifying a candidate next free bitmap comprises:

in response to assigning the candidate next free bitmap to a thread:

searching through the predetermined ordering of bitmaps, starting at the candidate next free bitmap, until identifying a first bitmap that (i) is unassigned to a thread and (ii) corresponds to a storage segment that includes one or more available blocks; and updating the first data to identify the first bitmap.

Embodiment 6 is the system of any one of embodiments 1-5, wherein each bitmap further comprises one or more of:

an ownership bit representing whether the bitmap is assigned to a thread, or data representing a number of available blocks in the storage segment corresponding to the bitmap.

Embodiment 7 is the system of any one of embodiments 1-6, wherein the plurality of bitmaps are stored in contiguous memory addresses of the data store.

Embodiment 8 is a method comprising the operations of any one of embodiments 1 to 7.

Embodiment 9 is one or more non-transitory computer storage media encoded with a computer program, the program comprising instructions that are operable, when executed by data processing apparatus, to cause the data processing apparatus to perform the operations of any one of embodiments 1 to 7.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. For example, the subject matter is described in context of scientific papers. The subject matter can apply to other indexed work that adds depth aspect to a search. In some cases, the actions recited in the claims can be performed in a different order and still achieve desirable results. In addition, the processes described do not necessarily require the particular order shown, or sequential order, to achieve desirable results. In certain implementations, multitasking and parallel processing can be advantageous.

What is claimed is:

1. A system comprising:
   a data store comprising a plurality of storage segments, wherein each storage segment comprises a plurality of blocks that are configured to store data; and
   an allocator system comprising:
   a plurality of threads, and
   a plurality of bitmaps, each bitmap corresponding to a respective storage segment of the plurality of storage segments, wherein each bitmap comprises a plurality of bits, each bit representing an availability of a respective block of the corresponding storage segment, and
   wherein the allocator system is configured to perform operations comprising:
   assigning a respective bitmap of the plurality of bitmaps to each thread of the plurality of threads;
   executing, by each thread of the plurality of threads, one or more write requests to one or more blocks of the corresponding storage segment of the bitmap assigned to the thread using the bitmap assigned to the thread, wherein executing the one or more write requests by the thread includes updating the bitmap assigned to the thread, comprising updating bits of the bitmap that represent blocks to which data was written; and determining that the storage segment corresponding to a first bitmap of the plurality of bitmaps assigned to a first thread of the plurality of threads has been filled and in response:
   determining whether there is a remaining bitmap of the plurality of bitmaps that (i) is unassigned to a thread and (ii) corresponds to a storage segment that includes one or more available blocks, and
   in response to determining that there is a remaining bitmap, assigning the remaining bitmap to the first thread.

2. The system of claim 1, wherein the operations further comprise:
determining that the storage segment corresponding to a second bitmap of the plurality of bitmaps assigned to a second thread of the plurality of threads has been filled and in response:
   determining whether there is a second remaining bitmap of the plurality of bitmaps that (i) is unassigned to a thread and (ii) corresponds to a storage segment that includes one or more available blocks, and
   in response to determining that there is no second remaining bitmap that (i) is unassigned to a thread and (ii) corresponds to a storage segment that includes one or more available blocks:
     identifying a third bitmap that (i) is already assigned to a thread and (ii) corresponds to a storage segment that includes one or more available blocks; and
     assigning the third bitmap to the second thread so that the third bitmap is assigned to more than one thread,
     wherein updating the third bitmap by the second thread comprises locking the third bitmap from being simultaneously updated by another thread.

3. The system of claim 1, wherein the operations further comprise:
maintaining first data identifying a candidate next free bitmap that (i) is predicted not to be assigned to a thread and (ii) corresponds to a storage segment that is predicted to include one or more available blocks,
wherein determining whether there is a remaining bitmap comprises evaluating the candidate next free bitmap.

4. The system of claim 3, wherein:
the plurality of bitmaps have a predetermined ordering; and
maintaining the first data identifying the candidate next free bitmap comprises:
   in response to assigning the candidate next free bitmap as the remaining bitmap to the first thread:
     searching through the plurality of bitmaps in the predetermined ordering, starting at the candidate next free bitmap, until identifying a second first bitmap that (i) is unassigned to a thread and (ii) corresponds to a storage segment that includes one or more available blocks; and
     updating the first data to identify the second bitmap.

5. The system of claim 1, wherein each bitmap further comprises one or more of:
an ownership bit representing whether the bitmap is assigned to a thread, or
data representing a number of available blocks in the storage segment corresponding to the bitmap.

6. The system of claim 1, wherein the plurality of bitmaps are stored in contiguous memory addresses of the data store.

7. A method of maintaining a data store comprising a plurality of storage segments, wherein each storage segment comprises a plurality of blocks that are configured to store data, the method comprising:
for each thread of a plurality of threads, assigning a respective bitmap of a plurality of bitmaps to the thread wherein each bitmap of the plurality of bitmaps corresponds to a respective storage segment of the plurality of storage segments of the data store, and wherein each bitmap comprises a plurality of bits each bit representing an availability of a respective block of the corresponding storage segment;
executing, by each thread of the plurality of threads, one or more write requests to one or more blocks of the corresponding storage segment of the bitmap assigned to the thread using the bitmap assigned to the thread, wherein executing the one or more write requests by the thread includes updating the bitmap assigned to the thread, comprising updating bits of the bitmap that represent blocks to which data was written; and
determining that the storage segment corresponding to a first bitmap of the plurality of bitmaps assigned to a first thread of the plurality of threads has been filled and in response:
   determining whether there is a remaining bitmap of the plurality of bitmaps that (i) is unassigned to a thread and (ii) corresponds to a storage segment that includes one or more available blocks, and
   in response to determining that there is a remaining bitmap, assigning the remaining bitmap to the first thread.

8. The method of claim 7, further comprising:
determining that the storage segment corresponding to a second bitmap of the plurality of bitmaps assigned to a second thread of the plurality of threads has been filled and in response:
   determining whether there is a second remaining bitmap of the plurality of bitmaps that (i) is unassigned to a thread and (ii) corresponds to a storage segment that includes one or more available blocks, and
   in response to determining that there is no second remaining bitmap that (i) is unassigned to a thread and (ii) corresponds to a storage segment that includes one or more available blocks:
     identifying a third bitmap that (i) is already assigned to a second thread and (ii) corresponds to a storage segment that includes one or more available blocks; and
     assigning the third bitmap to the second thread so that the third bitmap is assigned to more than one thread,
     wherein updating the third bitmap by the second thread comprises locking the third bitmap from being simultaneously updated by another thread.

9. The method of claim 7, further comprising:
maintaining first data identifying a candidate next free bitmap that (i) is predicted not to be assigned to a thread and (ii) corresponds to a storage segment that is predicted to include one or more available blocks,
wherein determining whether there is a remaining bitmap comprises evaluating the candidate next free bitmap.

10. The method of claim 9, wherein:
the plurality of bitmaps have a predetermined ordering; and
maintaining the first data identifying the candidate next free bitmap comprises:

searching through the plurality of bitmaps in the predetermined ordering, starting at the candidate next free bitmap, until identifying a second bitmap that (i) is unassigned to a thread and (ii) corresponds to a storage segment that includes one or more available blocks; and updating the first data to identify the second bitmap.

11. The method of claim 7, wherein each bitmap further comprises one or more of:

an ownership bit representing whether the bitmap is assigned to a thread, or data representing a number of available blocks in the storage segment corresponding to the bitmap.

12. The method of claim 7, wherein the plurality of bitmaps are stored in contiguous memory addresses of the data store.

13. One or more non-transitory computer storage media encoded with computer program instructions that when executed by a plurality of computers cause the plurality of computers to perform operations for maintaining a data store comprising a plurality of storage segments, wherein each storage segment comprises a plurality of blocks that are configured to store data, the operations comprising:

for each thread of a plurality of threads, assigning a respective bitmap of a plurality of bitmaps to the thread, wherein each bitmap of the plurality of bitmaps corresponds to a respective storage segment of the plurality of storage segments of the data store, and wherein each bitmap comprises a plurality of bits each representing an availability of a respective block of the corresponding storage segment;

executing, by each thread of the plurality of threads, one or more write requests to one or more blocks of the corresponding storage segment of the bitmap assigned to the thread using the bitmap assigned to the thread, wherein executing the one or more write requests by the thread includes updating the bitmap assigned to the thread, comprising updating bits of the bitmap that represent blocks to which data was written; and determining that the storage segment corresponding to a first bitmap of the plurality of bitmaps assigned to a first thread of the plurality of threads has been filled and in response:

determining whether there is a remaining bitmap of the plurality of bitmaps that (i) is unassigned to a thread and (ii) corresponds to a storage segment that includes one or more available blocks, and in response to determining that there is a remaining bitmap, assigning the remaining bitmap to the first thread.

14. The one or more non-transitory computer storage media of claim 13, wherein the operations further comprise:

determining that the storage segment corresponding to a second bitmap of the plurality of bitmaps assigned to a second thread of the plurality of threads has been filled and in response:

determining whether there is a second remaining bitmap of the plurality of bitmaps that (i) is unassigned to a thread and (ii) corresponds to a storage segment that includes one or more available blocks, and in response to determining that there is no second remaining bitmap that (i) is unassigned to a thread and (ii) corresponds to a storage segment that includes one or more available blocks:

identifying a third bitmap that (i) is already assigned to a thread and (ii) corresponds to a storage segment that includes one or more available blocks; and assigning the third bitmap to the second thread so that the third bitmap is assigned to more than one thread, wherein updating the third bitmap by the second thread comprises locking the third bitmap from being simultaneously updated by another thread.

15. The one or more non-transitory computer storage media of claim 13, wherein the operations further comprise:

maintaining first data identifying a candidate next free bitmap that (i) is predicted not to be assigned to a thread and (ii) corresponds to a storage segment that is predicted to include one or more available blocks, wherein determining whether there is a remaining bitmap comprises evaluating the candidate next free bitmap.

16. The one or more non-transitory computer storage media of claim 15, wherein:

the plurality of bitmaps have a predetermined ordering; and maintaining the first data identifying the candidate next free bitmap comprises:

in response to assigning the candidate next free bitmap as the remaining bitmap to the first thread:

searching through the plurality of bitmaps in the predetermined ordering, starting at the candidate next free bitmap, until identifying a second first bitmap that (i) is unassigned to a thread and (ii) corresponds to a storage segment that includes one or more available blocks; and updating the first data to identify the second bitmap.

17. The one or more non-transitory computer storage media of claim 13, wherein each bitmap further comprises one or more of:

an ownership bit representing whether the bitmap is assigned to a thread, or data representing a number of available blocks in the storage segment corresponding to the bitmap.

* * * * *